(12) United States Patent
Rached

(10) Patent No.: US 10,036,285 B2
(45) Date of Patent: *Jul. 31, 2018

(54) HEAT TRANSFER PROCESS

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 29 days.

This patent is subject to a terminal disclaimer.

(21) Appl. No.: 14/989,130

(22) Filed: Jan. 6, 2016

(65) Prior Publication Data

US 2016/0115827 A1    Apr. 28, 2016

Related U.S. Application Data

(63) Continuation of application No. 13/386,719, filed as application No. PCT/FR2010/051283 on Jun. 23, 2010, now Pat. No. 9,279,074.

(30) Foreign Application Priority Data

Jul. 28, 2009 (FR) ..................................... 09 55267

(51) Int. Cl.
*C09K 5/04* (2006.01)
*F01K 25/08* (2006.01)
*C10M 171/00* (2006.01)

(52) U.S. Cl.
CPC .............. *F01K 25/08* (2013.01); *C09K 5/045* (2013.01); *C10M 171/008* (2013.01); *C09K 2205/106* (2013.01); *C09K 2205/11* (2013.01); *C09K 2205/112* (2013.01); *C09K 2205/12* (2013.01); *C09K 2205/122* (2013.01); *C09K 2205/126* (2013.01); *C10M 2207/2835* (2013.01); *C10M 2209/043* (2013.01); *C10M 2209/1033* (2013.01); *C10N 2220/30* (2013.01); *C10N 2220/301* (2013.01); *C10N 2220/302* (2013.01); *C10N 2220/303* (2013.01); *C10N 2220/306* (2013.01)

(58) Field of Classification Search
CPC ......... Y02E 10/46; Y02E 20/16; C09K 5/042; C09K 5/044; C09K 5/045; C09K 2205/12; C09K 2205/122; C09K 2205/126; F01K 25/18
See application file for complete search history.

(56) References Cited

U.S. PATENT DOCUMENTS

| 4,227,645 | A | 10/1980 | De La Farge et al. |
| 4,465,609 | A | 8/1984 | Denis et al. |
| 4,948,526 | A | 8/1990 | Fellows et al. |
| 6,814,884 | B2 | 11/2004 | Jannick et al. |
| 6,913,076 | B1 | 7/2005 | Hays |
| 9,267,066 | B2 | 2/2016 | Rached |
| 9,279,074 | B2 | 3/2016 | Rached |
| 2005/0166607 | A1 | 8/2005 | Brasz et al. |
| 2005/0188697 | A1 | 9/2005 | Zyhowski et al. |
| 2006/0010872 | A1 | 1/2006 | Singh et al. |
| 2006/0242985 | A1 | 11/2006 | Leek et al. |
| 2007/0007488 | A1 | 1/2007 | Singh et al. |
| 2008/0314073 | A1 | 12/2008 | Minor |
| 2009/0000299 | A1* | 1/2009 | Ast .................. F01K 23/04 60/618 |
| 2009/0049856 | A1 | 2/2009 | Sun |
| 2009/0095014 | A1 | 4/2009 | Sun et al. |
| 2009/0302264 | A1* | 12/2009 | Serrano ............ C09K 5/045 252/68 |
| 2010/0139274 | A1 | 6/2010 | Zyhowski et al. |
| 2010/0154419 | A1 | 6/2010 | Kontomaris |
| 2011/0144216 | A1 | 6/2011 | Hulse et al. |
| 2012/0004299 | A1 | 1/2012 | Hulse et al. |
| 2012/0117990 | A1 | 5/2012 | Rached et al. |
| 2012/0117991 | A1 | 5/2012 | Rached |
| 2013/0255284 | A1 | 10/2013 | Rached |
| 2016/0115362 | A1 | 4/2016 | Rached |

FOREIGN PATENT DOCUMENTS

| JP | 4-110388 | 4/1992 |
| JP | 2007-520662 A | 7/2007 |
| JP | 2008-506819 A | 3/2008 |
| JP | 2008-524433 A | 7/2008 |
| JP | 2008-531975 A | 8/2008 |
| JP | 2009-523859 A | 6/2009 |
| WO | WO 02/40613 A1 | 5/2002 |
| WO | WO 2004/037913 A2 | 5/2004 |
| WO | WO 2004/037913 A3 | 5/2004 |
| WO | WO 2005/078046 A1 | 8/2005 |
| WO | WO 2005/085398 A2 | 9/2005 |
| WO | WO 2005/085398 A3 | 9/2005 |
| WO | WO 2006/014609 A2 | 2/2006 |
| WO | WO 2006/014609 A3 | 2/2006 |
| WO | WO 2006/069362 A2 | 6/2006 |
| WO | WO 2006/069362 A3 | 6/2006 |
| WO | WO 2006/094304 A2 | 9/2006 |
| WO | WO 2006/094304 A3 | 9/2006 |
| WO | WO 2006/113902 A2 | 10/2006 |
| WO | WO 2006/113902 A3 | 10/2006 |
| WO | WO 2007/002625 A2 | 1/2007 |

(Continued)

OTHER PUBLICATIONS

XP-002572845 Organic Rankine Cycle—Wikipedia.
XP-002572844 Rankine Cycle—Wikipedia.
XP-002572843 Technological and Economical Survey of Organic Rankine Cycle Systems—Sylvain Quoilin and Vincent Lemort—Thermodynamics Laboratory.

(Continued)

*Primary Examiner* — John R Hardee
(74) *Attorney, Agent, or Firm* — Buchanan Ingersoll & Rooney P.C.

(57) ABSTRACT

The use of a refrigerant in organic Rankine cycle systems including at least one hydrofluoroolefin, having at least four carbon atoms represented by the formula (I) R1CH=CHR2 in which R1 and R2 independently represent alkyl groups having from 1 to 6 carbon atoms, substituted with at least one fluorine atom, optionally with at least one chlorine atom.

8 Claims, No Drawings

(56) References Cited

FOREIGN PATENT DOCUMENTS

| WO | WO 2007/053697 A2 | 5/2007 |
|----|-------------------|--------|
| WO | WO 2007/082046 A1 | 7/2007 |
| WO | WO 2008/134061 A2 | 11/2008 |
| WO | WO 2008/154612 A1 | 12/2008 |
| WO | WO 2008/157757 A1 | 12/2008 |

OTHER PUBLICATIONS

International Search Report issued in PCT/FR2010/051283, dated Nov. 17, 2010, 6 pages, European Patent Office, Rijswijk, NL (English/French Language versions).

Haaf, Siegfried, et al., "Refrigeration technology" in *Ullmann's Encyclopedia of Industrial Chemistry*, Jul. 15, 2000, pp. 38-39, John Wiley & Sons, Inc., XP002572156.

Report of Reconsideration by Examiner Before Appeal issued by the Japanese Patent Office in JP Patent Application No. 2012-522207, dated Jun. 19, 2015, 4 pages (including English-language translation).

Notification of Reasons for Refusal issued by the Japanese Patent Office in JP Patent Application No. 2015-107072, dated Aug. 24, 2016, 7 pages (including English-language translation).

* cited by examiner

HEAT TRANSFER PROCESS

CROSS REFERENCE TO RELATED APPLICATIONS

The present application is a continuation of U.S. application Ser. No. 13/386,719, filed on Jan. 24, 2012, which is a U.S. national stage of International Application No. PCT/FR2010/051283, filed on Jun. 23, 2010, which claims the benefit of French Application No. 0955267, filed on Jul. 28, 2009. The entire contents of each of U.S. application Ser. No. 13/386,719, International Application No. PCT/FR2010/051283 and French Application No. 0955267 are hereby incorporated herein by reference in their entirety.

TECHNICAL FIELD

The present invention relates to a process for energy conversion by means of a composition containing hydrofluoroolefins. It relates more particularly to the use of a composition containing hydrofluoroolefins in organic Rankine cycle systems.

BACKGROUND

With the constant increase in energy prices, there is a growing need to optimize energy usage and recovery. Moreover, campaigns for increasing awareness of the need to reduce carbon dioxide emissions show the importance of energy recovery.

The principle of energy recovery is conversion of unused energy into electricity. The expansion of a fluid such as gas transforms kinetic energy into mechanical energy. Thus, turbines produce electricity by utilizing the phenomenon of expansion to drive a wheel and produce electricity.

The Rankine cycle constitutes the elementary cycle at an industrial level for producing energy from liquid water/steam. It is composed of the following phases: (i) heating, (ii) evaporation at constant temperature until saturation is attained, (iii) isentropic expansion (ideal case), (iv) condensation at constant temperature and (v) isentropic compression.

The Rankine cycle can be applied to other thermodynamic systems, in particular using fluids other than steam. Organic Rankine cycles make it possible to exploit the properties of these other fluids.

The problems posed by substances depleting the ozone layer of the atmosphere (having ozone depletion potential, ODP) were discussed in Montreal, where the protocol was signed requiring a reduction of the production and use of chlorofluorocarbons (CFCs). Amendments have been made to this protocol, requiring abandonment of CFCs and extending the controls to other products.

Hydrofluorocarbons (HFCs) have replaced CFCs and/or hydrochlorofluorocarbons (HCFCs).

Thus, 1,1,3,3-pentafluoropropane (HFC-245fa) has been proposed as fluid for organic Rankine cycle systems in which HFC-245fa is heated at a temperature between 140° F. and 300° F. (60 and 149° C.) (WO 2006/113902).

Document WO 2005/085398 discloses the use of polyfluorinated ethers and polyfluorinated ketones as fluid for converting thermal energy to mechanical energy, in particular for organic Rankine cycle systems, at the critical temperature or above the critical temperature of HFC-245fa (154° C.).

The problem encountered with these polyfluorinated ethers or ketones is the low pressure at the condenser, thus promoting infiltration of air into the installations. The presence of moisture and oxygen in the installations leads to corrosion and to destruction of the mechanical parts.

DETAILED DESCRIPTION

The applicant has now discovered that compositions containing hydrofluoroolefins are quite particularly suitable as fluid for energy conversion in organic Rankine cycle systems, especially systems operating at low temperature between 60 and 150° C. Moreover, these compositions have a negligible ODP and a GWP (Global Warming Potential) less than that of the existing fluids. These mixtures also have critical temperatures above 150° C., and can therefore be used at higher temperatures in organic Rankine cycle systems.

A fluid's contribution to the greenhouse effect is quantified by a criterion, GWP, which summarizes the warming effect, taking a reference value of 1 for carbon dioxide.

Organic Rankine cycle systems operate with fluids called refrigerants in one or more stages.

The present invention relates to an energy conversion process using a turbine system having at least one stage comprising successively a step of evaporation of a refrigerant, an expansion step in a turbine, a step of desuperheating in an internal exchanger, a step of condensation of said fluid and a step of liquid compression in a pump, characterized in that the refrigerant comprises at least one hydrofluoroolefin, having at least 4 carbon atoms represented by the formula (I) $R^1CH\!=\!CHR^2$ in which $R^1$ and $R^2$ represent, independently, alkyl groups having from 1 to 6 carbon atoms, substituted with at least one fluorine atom, optionally with at least one chlorine atom.

Preferably, at least one alkyl group of the hydrofluoroolefin is completely substituted with fluorine atoms.

Preferably, the temperature of condensation of the refrigerant is greater than or equal to the ambient temperature of the air or else of a natural cold source (lake or flow of water), normally between −40° C. and 50° C. depending on the seasons and the geographical location.

Preferably, the temperature of evaporation of the refrigerant is between 60 and 150° C., and advantageously between 80° C. and 150° C.

As hydrofluoroolefins of formula (I) that are particularly advantageous, we may notably mention 1,1,1,4,4,4-hexafluorobut-2-ene, 1,1,1,4,4,5,5,5-octafluoropent-2-ene, 1,1,1,4-tetrafluorobut-2-ene, 1,1,1,4,4-pentafluorobut-2-ene, 1,1,4-trifluorobut-2-ene, 1,1,1-trifluorobut-2-ene, 4-chloro-1,1,1-trifluorobut-2-ene, 4-chloro-4,4-difluorobut-2-ene.

The preferred hydrofluoroolefins of formula (I) can be in the cis or trans form or mixture of the two.

Besides the hydrofluoroolefin(s) of formula (I), the refrigerant can comprise at least one compound selected from hydrofluorocarbons, hydrocarbons, (hydro)fluoroethers, hydrochlorofluoropropenes, hydrofluoropropenes, ethers, alcohols, methyl formate, carbon dioxide and trans-1,2-dichloroethylene.

As hydrofluorocarbons, we may notably mention 1,1,1,3,3-pentafluorobutane, 1,1,1,2-tetrafluoroethane, pentafluoroethane, 1,1,1,3,3-pentafluoropropane, 1,1,1,2,3-pentafluoropropane, 1,1,1,2,2-pentafluoropropane, 1,1,1,3,3,3-hexafluoropropane, 1,1,2,2,3-pentafluoropropane, 1,1,1,3,3-pentafluorobutane, 1,1,1,2,2,3,4,5,5,5-decafluoropentane and 1,1,1,2,3,3,3-heptafluoropropane.

Hydrocarbons having at least three carbon atoms are preferred. Hydrocarbons with five carbon atoms such as pentane, isopentane, cyclopentane are particularly preferred.

The preferred hydrochlorofluoropropenes are 2-chloro-3,3,3-trifluoroprop-1-ene and 1-chloro-3,3,3-trifluoroprop-1-ene, in particular trans-1-chloro-3,3,3-trifluoroprop-1-ene.

The preferred hydrofluoroethers are those having from three to six carbon atoms.

As hydrofluoroethers, we may notably mention heptafluoromethoxypropane, nonafluoromethoxybutane and nonafluoroethoxybutane. The hydrofluoroether is available in several isomeric forms such as 1,1,1,2,2,3,3,4,4-nonafluoroethoxybutane, 1,1,1,2,3,3-hexafluoro-2-(trifluoromethyl)-3-ethoxybutane, 1,1,1,2,2,3,3,4,4-nonafluoro-methoxybutane, 1,1,1,2,3,3-hexafluoro-2-(trifluoromethyl)-3-methoxybutane, and 1,1,1,2,2,3,3-heptafluoromethoxypropane.

The preferred hydrofluoropropenes are trifluoropropenes such as 1,1,1-trifluoropropene, tetrafluoropropenes such as 2,3,3,3-tetrafluoropropene (HFO-1234yf), and 1,3,3,3-tetrafluoropropene (cis and/or trans).

The ethers can be selected from dimethyl ether, diethyl ether, dimethoxymethane or dipropoxymethane.

The alcohols can be selected from ethanol, isopropanol, butanol and isobutanol.

Preferably, the refrigerant comprises at least one hydrofluoroolefin of formula (I) and at least one hydrofluorocarbon. The hydrofluorocarbon is advantageously selected from 1,1,1,3,3-pentafluorobutane and 1,1,1,3,3-pentafluoropropane.

Azeotropic compositions of 1,1,1,4,4,4-hexafluorobut-2-ene or of 1,1,1,4,4,5,5,5-octafluoro-pent-2-ene with methyl formate, pentane, isopentane, cyclopentane or trans-1,2-dichloroethylene may also be suitable.

Preferably, the refrigerant comprises at least 10 wt. % of hydrofluoroolefins of formula (I).

According to one embodiment of the invention, the refrigerant comprises from 40 to 100 wt. % of 1,1,1,4,4,4-hexafluorobut-2-ene and from 0 to 60 wt. % of at least one compound selected from pentane, isopentane, cyclopentane and trans-1,2-dichloroethylene.

As refrigerants that are particularly preferred, we may mention those comprising from 60 to 100 wt. % of 1,1,1,4,4,4-hexafluorobut-2-ene and from 0 to 40 wt. % of cyclopentane, pentane, isopentane or trans-1,2-dichloroethylene.

The refrigerant used in the present invention can comprise a stabilizer of the hydrofluoroolefin. The stabilizer represents at most 5 wt. % relative to the total composition of the fluid.

As stabilizers, we may notably mention nitromethane, ascorbic acid, terephthalic acid, azoles such as tolutriazole or benzotriazole, phenolic compounds such as tocopherol, hydroquinone, t-butyl hydroquinone, 2,6-di-ter-butyl-4-methylphenol, epoxides (alkyl optionally fluorinated or perfluorinated or alkenyl or aromatic) such as n-butyl glycidyl ether, hexanediol diglycidyl ether, allyl glycidyl ether, butylphenylglycidyl ether, phosphites, phosphates, phosphonates, thiols and lactones.

The refrigerant used in the process according to the present invention can comprise lubricants such as mineral oil, alkylbenzene, polyalfaolefin, polyalkylene glycol, polyol ester and polyvinyl ether. The lubricants used with the refrigerant can comprise nanoparticles for improving the thermal conductivity of the fluid as well as its compatibility with the lubricants. As nanoparticles, we may notably mention particles of $Al_2O_3$ or of $TiO_2$.

The lubricants used with the refrigerant can comprise dehumidifying agents of the zeolite type. The zeolites absorb water, which prevents corrosion and deterioration of performance.

EXPERIMENTAL SECTION

Evap: evaporator,
Cond: condenser,
Temp: temperature,
P: pressure,
Efficiency: this is the ratio of the power supplied by the turbine to the useful high-temperature power supplied to the system.
The performance of the refrigerant in the operating conditions in an energy conversion cycle with temperature at the evaporator maintained at 11.7° C. and at the condenser at 149° C. are given below.
Isentropic efficiency of the turbine: 100%
C: Isopentane
D: TDCE
F: pentane
G: 1,1,1,4,4,4-hexafluorobut-2-ene
PFE-PFIPK (perfluoroethyl perfluoroisopropyl ketone)
MPFBE (methyl perfluorobutyl ether)

| | | Temp cond inlet (° C.) | Temp cond outlet (° C.) | Temp pump outlet (° C.) | Temp evap inlet (° C.) | Temp turbine inlet (° C.) | Temp turbine outlet (° C.) | evap P (bar) | cond P (bar) | Lapse | isentropic efficiency | % Power supplied | Efficiency, % |
|---|---|---|---|---|---|---|---|---|---|---|---|---|---|
| | 245fa | 11.7 | 11.7 | 12.7 | 149 | 149 | 25.7 | 33.5 | 0.86 | 0.00 | 1.00 | 100 | 100 |
| | PFE-PFIPK | 11.7 | 11.7 | | 149 | 149 | | 12.9 | 0.29 | 0.000 | 1.0 | 149 | 95 |
| | MPFBE | 11.7 | 11.7 | | 149 | 149 | | 8.7 | 0.14 | 0.000 | 1.0 | 164 | 102 |
| | G | 11.7 | 11.7 | 12.1 | 149 | 149 | 54.2 | 19.7 | 0.42 | 0.00 | 1.00 | 98 | 107 |
| F | G | | | | | | | | | | | | |
| 20 | 80 | 14.3 | 11.7 | 12.2 | 149 | 149 | 57.2 | 21.6 | 0.67 | -2.61 | 1.00 | 110 | 107 |
| 30 | 70 | 11.7 | 11.7 | 12.2 | 149 | 149 | 57.3 | 21.5 | 0.68 | -0.01 | 1.00 | 121 | 110 |
| 40 | 60 | 14.1 | 11.7 | 12.2 | 149 | 150 | 58.7 | 21.0 | 0.67 | -2.39 | 1.00 | 132 | 109 |
| 50 | 50 | 16.5 | 11.7 | 12.2 | 149 | 151 | 60.6 | 20.3 | 0.67 | -4.81 | 1.00 | 144 | 109 |
| C | G | | | | | | | | | | | | |
| 20 | 80 | 17.2 | 11.7 | 12.3 | 149 | 149 | 57.4 | 23.0 | 0.78 | -5.50 | 1.00 | 106 | 104 |
| 30 | 70 | 13.8 | 11.7 | 12.3 | 149 | 149 | 56.3 | 23.3 | 0.79 | -2.05 | 1.00 | 116 | 107 |
| 40 | 60 | 11.8 | 11.7 | 12.3 | 149 | 149 | 56.9 | 23.0 | 0.79 | -0.05 | 1.00 | 127 | 110 |
| 50 | 50 | 13.4 | 11.7 | 12.3 | 149 | 150 | 58.5 | 22.5 | 0.79 | -1.70 | 1.00 | 138 | 110 |
| 60 | 40 | 15.0 | 11.7 | 12.3 | 149 | 151 | 59.9 | 21.8 | 0.78 | -3.29 | 1.00 | 149 | 109 |
| D | G | | | | | | | | | | | | |
| 10 | 90 | 13.4 | 11.7 | 12.1 | 149 | 149 | 50.7 | 20.1 | 0.51 | -1.70 | 1.00 | 100 | 107 |
| 15 | 85 | 12.9 | 11.7 | 12.1 | 149 | 149 | 48.0 | 20.2 | 0.52 | -1.19 | 1.00 | 102 | 107 |
| 20 | 80 | 12.2 | 11.7 | 12.1 | 149 | 149 | 44.9 | 20.2 | 0.53 | -0.50 | 1.00 | 105 | 108 |
| 30 | 70 | 12.6 | 11.7 | 12.1 | 149 | 150 | 39.4 | 19.9 | 0.53 | -0.89 | 1.00 | 110 | 108 |
| 40 | 60 | 16.2 | 11.7 | 12.1 | 149 | 152 | 35.1 | 19.4 | 0.53 | -4.46 | 1.00 | 116 | 107 |

The results show the low pressure at the condenser for the two products PEE-PFIPK and MPFBE, which promotes infiltration of air into the installations.

The invention claimed is:

1. An energy conversion process employing a turbine system having at least one stage comprising successively:
   evaporating a refrigerant;
   expanding said refrigerant in a turbine;
   desuperheating said refrigerant in an internal exchanger;
   condensing said refrigerant; and
   compressing said refrigerant in a pump,
   wherein
   the energy conversion process is an organic Rankine cycle;
   the refrigerant comprises at least one hydrofluoroolefin having at least 4 carbon atoms represented by the formula $R^1CH=CHR^2$ in which $R^1$ and $R^2$ represent, independently, alkyl groups having from 1 to 6 carbon atoms, substituted with at least one fluorine atom, optionally substituted with at least one chlorine atom, wherein the refrigerant further comprises a lubricant.

2. The process as claimed in claim 1, wherein the refrigerant further comprises at least one compound selected from the group consisting of hydrofluorocarbons, hydrocarbons, (hydro)fluoroethers, hydrochlorofluoropropenes, hydrofluoropropenes, ethers, methyl formate, carbon dioxide and trans-1,2-dichloroethylene.

3. The process as claimed in claim 1, wherein the refrigerant further comprises at least one hydrofluorocarbon selected from the group consisting of 1,1,3,3,3-pentafluoropropane and 1,1,3,3,3-pentafluorobutane.

4. The process as claimed in claim 1, wherein the refrigerant further comprises at least one hydrocarbon selected from the group consisting of pentane, isopentane and cyclopentane.

5. The process as claimed in claim 1, wherein the refrigerant comprises from 40 to 100 wt. % of 1,1,1,4,4,4-hexafluorobut-2-ene and from 0 to 60 wt. % of at least one compound selected from the group consisting of pentane, isopentane, cyclopentane and trans-1,2-dichloroethylene.

6. The process as claimed in claim 1, wherein the refrigerant comprises from 60 to 100 wt. % of 1,1,1,4,4,4-hexafluorobut-2-ene and from 0 to 40 wt. % of cyclopentane, pentane, isopentane or trans-1,2-dichloroethylene.

7. The process as claimed in claim 1, wherein the refrigerant further comprises a stabilizer.

8. The process as claimed in claim 1, wherein the lubricant is polyalkylene glycol, polyol ester or polyvinyl ether.

* * * * *